June 16, 1953  G. W. JOHNSON  2,641,796
POULTRY PICKING MACHINE
Filed May 24, 1948  4 Sheets-Sheet 2

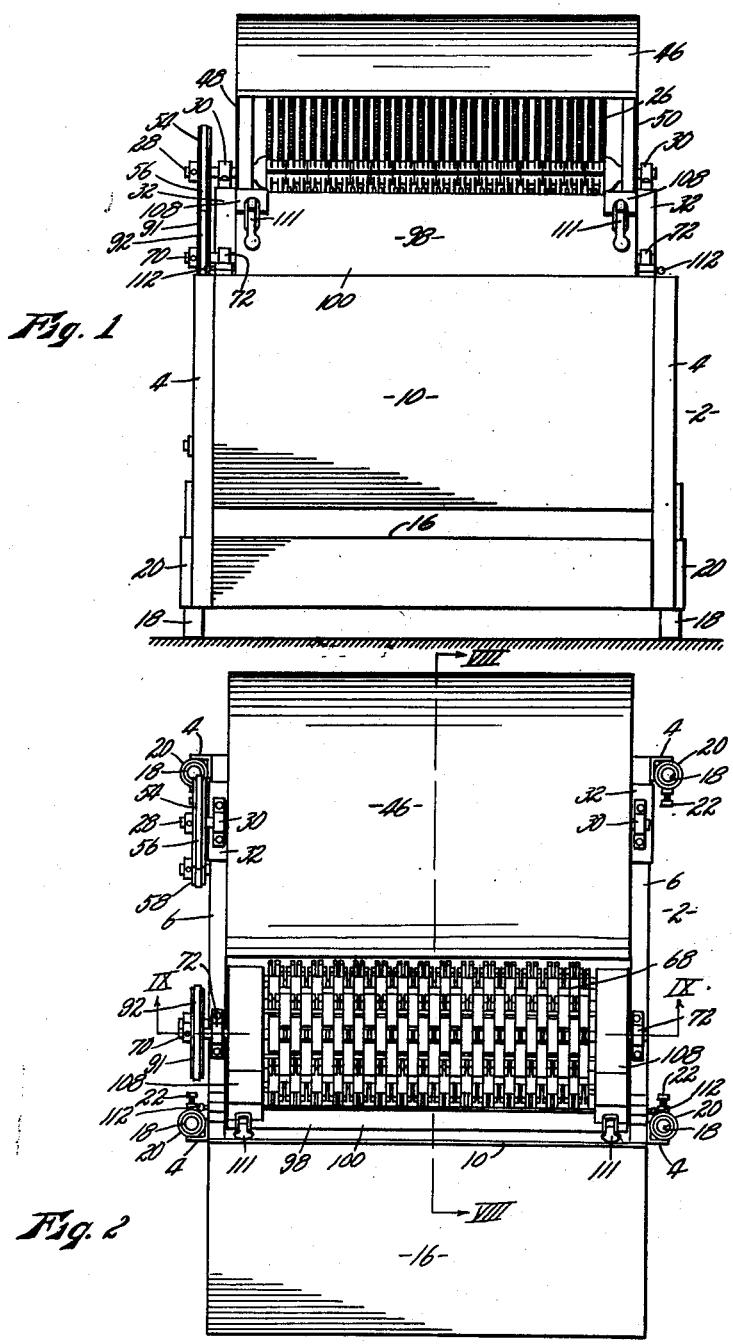

INVENTOR,
Gordon W. Johnson.
BY Roy E. Hamilton,
Attorney.

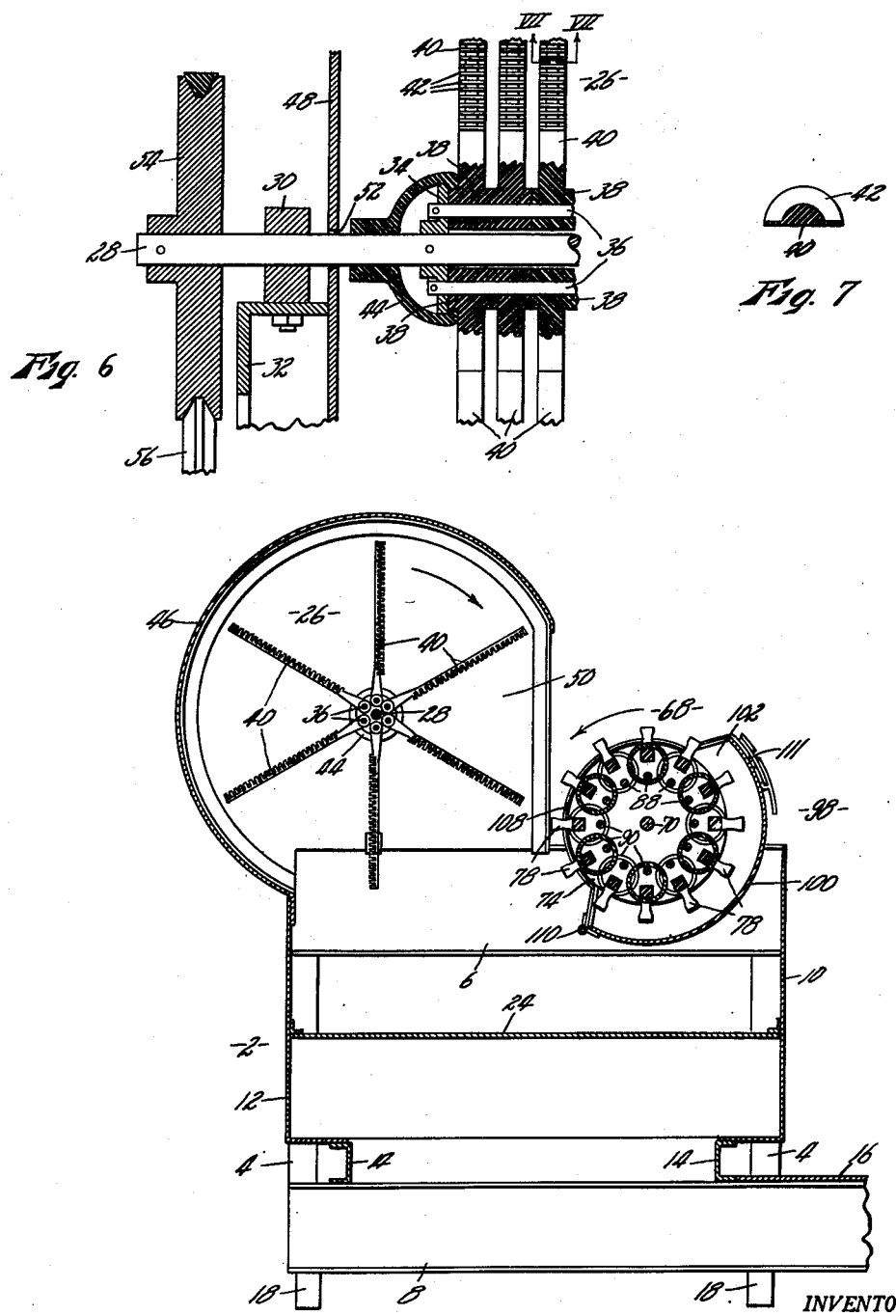

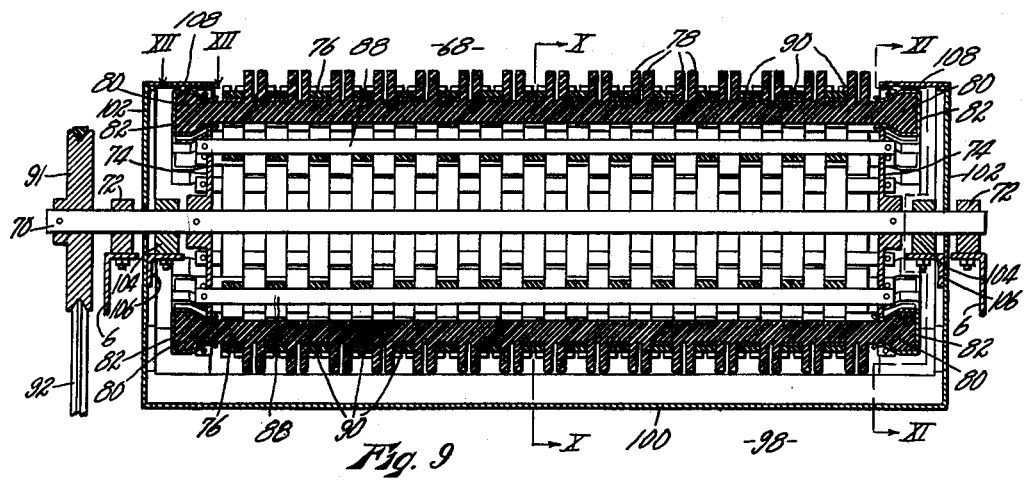

Patented June 16, 1953

2,641,796

UNITED STATES PATENT OFFICE 2,641,796

POULTRY PICKING MACHINE

Gordon W. Johnson, Raytown, Mo., assignor to Gordon Johnson Company, Kansas City, Mo., a corporation of Missouri Application May 24, 1948, Serial No. 28,814

2 Claims. (Cl. 17—11.1)

This invention relates to poultry picking machines and has particular reference to a poultry picking machine wherein the fowl or parts thereof are introduced between a pair of rotating feather engaging drums.

The principal object of the present invention is the provision of a poultry picking machine having a pair of counter-rotating drums between which a fowl may be introduced, one of said drums being provided with feather engaging fingers suitable for performing the roughing stage of picking, and the other of said drums being provided with feather engaging fingers suitable for performing the finishing stage of picking.

Another object is the provision of a poultry picking machine having a pair of counter-rotating drums between which a fowl may be introduced, one of said drums being provided with relatively long, flexible and widely spaced feather engaging fingers, and the other of said drums being provided with relatively short, stiff, closely spaced feather engaging fingers.

Other objects are simplicity and economy of construction, ease and convenience of use, and adaptability to perform the entire picking operation.

With these objects in view, as well as other objects which will become apparent in the course of the specification, reference will be had to the drawing, wherein—

Figure 1 is a front elevation of a poultry picking machine embodying the present invention.

Fig. 2 is a plan view of the machine.

Fig. 6 is an enlarged fragmentary section taken on line VI—VI of Fig. 5, with the fingers left partially in elevation.

Fig. 7 is an enlarged cross-section of one of the roughing fingers, taken on line VII—VII of Fig. 6.

Fig. 8 is an enlarged fragmentary cross section taken on line VIII—VIII of Fig. 2.

Fig. 9 is an enlarged fragmentary section taken on line IX—IX of Fig. 2.

Fig. 10 is a sectional view taken on line X—X of Fig. 9.

Fig. 11 is an irregular section taken on line XI—XI of Fig. 9.

Fig. 12 is an enlarged fragmentary section taken on line XII—XII of Fig. 9.

Fig. 13 is a fragmentary section taken on line XIII—XIII of Fig. 12.

Fig. 14 is an enlarged fragmentary section taken on line XIV—XIV of Fig. 11.

Figure 3:
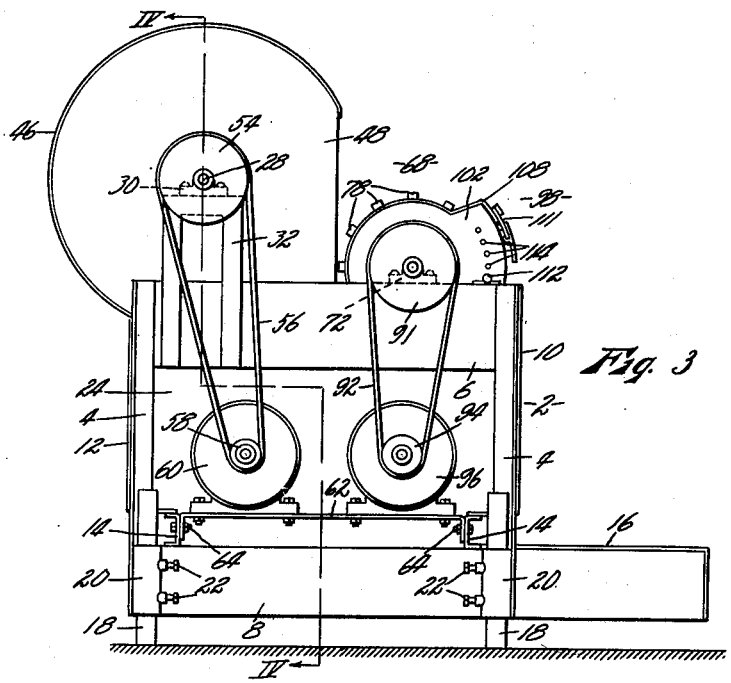
Fig. 3 is a left end view of the machine.

Like reference numerals apply to similar parts throughout the several views, and the numeral 2 applies to a substantially rectangular housing including vertically disposed angle iron corner posts 4, channels 6 rigidly connecting the upper ends of the front and rear corner posts at each end of the machine, channels 8 rigidly connecting the lower ends of the front and rear corner posts at each end of the machine, front panel 10 and rear panel 12 carried rigidly by channels 6 and 8, and a pair of parallel spaced apart channels 14 extending horizontally between and rigidly connected to channels 8. Channels 8 are extended forwardly from front panel 10 and carry a horizontal platform 16 on which the operator may stand while using the machine. A floor-engaging leg 18 is carried slidably in a vertically disposed sleeve 20 rigidly fixed to the lower end portion of each corner post 4, and may be adjustably fixed therein by set screws 22 to adjust the elevation of the machine above the floor to bring it into proper relation with other poultry processing equipment. For example, the fowl to be picked by this machine may be conveyed past the machine on a slowly moving conveyor, and for this purpose the machine must be disposed at the proper elevation relative to said conveyor. A feather tray 24 extends between and is secured to front panel 10 and rear panel 12, being secured at its left end as viewed in Fig. 4 to left channel 6, sloping downwardly to the right, and secured at its lower edge to right channel 8.

A picking or stripper drum 26 suitable for performing the roughing stage of picking is carried on a horizontal shaft 28 disposed above and adjacent the rearward edge of the machine and carried for rotation in bearings 30 mounted on brackets 32 fixed to channels 6. Said drum comprises a pair of longitudinally spaced apart end discs 34 fixed on shaft 28 for rotation therewith, a plurality of rods 36 extending between said end discs in parallel spaced apart relation to shaft 28, said rods being spaced equally about said shaft, and a plurality of feather engaging members carried on each of said rods, each of said members being formed of rubber or other resilient material and comprising a sleeve portion 38 carried pivotally on one of rods 36, and one or more integral elongated fingers 40 extending outwardly from said sleeve. Since said fingers are relatively long and slender they normally hang limply downwardly, but are extended radially outwardly by centrifugal force whenever shaft 28 is rotated in the direction indicated by the arrow in Fig. 8. All of the views show fingers 40 in their extended position. As shown in Fig. 7, each finger is semi-circular in cross section, and has its forward or curved face formed to present closely spaced, radially extending ribs 42 which provide a more efficient wiping contact with the surface of a fowl. End discs 34 and the ends of rods 36 are covered by protective cups 44. Drum 26 is partially covered by a substantially cylindrical housing 46 open along its lower and forward edges and having end walls 48 and 50 rigidly connected to channels 6. Said end walls are spaced inwardly from bearings 30 and are provided, as shown in Fig. 6, with holes 52 through which shaft 28 passes.

Figures 4, 5:
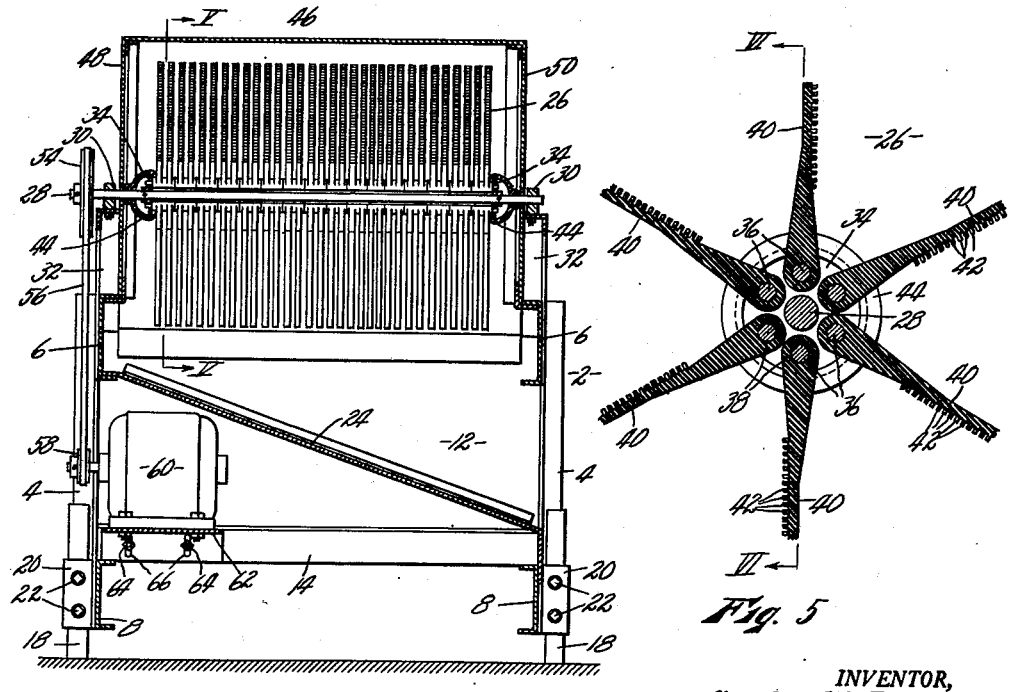
Fig. 4 is a sectional view taken on line IV—IV of Fig. 3, with parts left in elevation.
Fig. 5 is an enlarged fragmentary section of the roughing drum, taken on line V—V of Fig. 4.

A pulley 54 is rigidly fixed to the extended left end of shaft 28, and is operatively connected by means of belt 56 with a pulley 58 mounted on the shaft of motor 60. As best shown in Figs. 3 and 4, said motor is mounted on a plate 62 having its forward and rearward edge portions turned downwardly and secured to channels 14 by means of bolts 64. Said bolts pass through vertically elongated slots 66 in plate 62, whereby plate 62 may be adjusted vertically to adjust the tension in belt 56.

A picking or stripper drum 68 suitable for performing the finishing stage of picking is carried on a horizontal shaft 70 disposed adjacent the forward edge of the machine and carried for rotation in bearings 72 mounted on the upper edges of channels 6. Said drum comprises two end discs 74 spaced apart and securely attached to shaft 70 for rotation therewith. A series of elastic bars 76 secured at their opposite ends respectively to said discs are preferably equally spaced about the periphery of said discs and in parallel relation with shaft 70. Each bar 76 is provided with a series of integral spaced apart feather engaging fingers 78, said fingers being arranged in closely spaced pairs. The fingers of adjacent bars are disposed in offset relation in such a manner as to insure substantially complete contact with the fowl's body. Each enlarged end 80 of the bar 76 is preferably provided with a metal fitting or clip 82 which rigidly engages the enlarged end of the bar and provides means whereby the bar is secured between a pair of lips 84 integral with disc 74. When the clip 80 is positioned, a pin 86 is inserted through lips 84 to secure the clip in position.

In radial alignment with each of the bars 76 and spaced inwardly therefrom is a rod 88 disposed parallel with shaft 70 and carried by end discs 74. A plurality of pliable bands 90 encompass rod 88 and the adjacent bar 76 to limit the outward travel of the elastic bars due to centrifugal force when the drum is rotated. These bands are located in spaced apart relation and extend about bar 76 between adjacent pairs of fingers 78 to insure a substantially cylindrical form to the contour of the outer ends of the feather engaging fingers during the picking operation. The bands are preferably pliable but not elastic so as to provide a definite limit to the outward movement of the bars. A metallic binder 89 is placed about each bar 76 between each pair of fingers 78 in order to prevent wear of said bar by band 90.

A pulley 91 is rigidly fixed to the extended left end of shaft 70, and is operatively connected by means of belt 92 with a pulley 94 mounted rigidly on the shaft of motor 96, said motor being carried on plate 62 adjacent motor 60. By means of said motors, drums 26 and 68 are rotated in opposite directions as indicated by the arrows in Fig. 8.

A shielding drum 98 is disposed about finishing drum 68 and comprises a substantially semi-cylindrical wall 100 of greater diameter than the maximum diameter of drum 68 and disposed concentrically thereabout, end walls 102 carrying said cylindrical wall spaced outwardly from drum discs 74 and disposed concentrically on shaft 70, and bearings 104 mounted rigidly on brackets 106 fixed to the inner surfaces of end walls 102, said bearings being carried for rotation on shaft 70 whereby drum 98 may be turned to expose any desired portion of drum 68 for use. A curved cover plate 108 is hinged as at 110 to one edge of semi-cylindrical wall 100 at each end thereof, extends around the open side of drum 98 and is releasably secured to the opposite edge portion of wall 100 by means of tension fasteners 111. Said cover plates extend inwardly from the ends of drum 98 sufficiently to enclose end discs 74 of drum 68, and may be hinged outwardly to provide access for removing and replacing bars 76. Shielding drum 98 is held firmly in place and prevented from rotating with shaft 70 by means of a pair of detents 112 carried respectively at the upper edges of channels 6 and adapted to project inwardly into any of a series of arcuately spaced apart holes 114 provided in end walls 102. Thus, by moving detents 112 outwardly and turning shielding drum 98 on shaft 70, any desired portion of drum 68 may be exposed for use, while covering the remainder thereof as a safety precaution. As shown in Fig. 14, each detent 112 is carried slidably in a housing 116 fixed to channel 6, said housing carrying a compression spring 118 bearing at one end against said housing and at its opposite end against a flange 120 formed on the detent, thereby urging said detent inwardly to engage one of holes 114 in end wall 102.

In operation, roughing drum 26 and finishing drum 68 are set in rotation as previously described. The fowl is first killed, scalded, and otherwise prepared for picking by means not shown, and then an operator standing on platform 16 introduces the fowl manually between drums 26 and 68 so that each part of the bird contacts sequentially drum 26 and then drum 68. Fingers 40 of drum 26, being long, quite flexible, and therefore adapted to conform readily to the contour of the bird, are particularly adapted to perform the roughing stage of picking wherein the bulk of the feathers are removed. Furthermore, the relatively wide spacing of fingers 40, and their whip-like movement, facilitates rapid disposal of the removed feathers and prevents clogging of the drum surface. On the other hand, fingers 40 are not sufficiently rigid, nor do they wipe the surface of the fowl with sufficient force to remove the pin feathers or to reach easily the relatively inaccessible portions of the fowl, such as between the legs and around the wings. On the other hand, fingers 78 of finishing drum 68 are relatively short and stiff, and are closely spaced, thereby contacting and wiping all parts of the fowl with considerable pressure to remove the pin feathers and other feathers still clinging after the rough picking. Fingers 78 are extended outwardly by centrifugal force, but may be depressed inwardly by pressing the fowl thereagainst, and thereby follow closely the contour of the bird. Feathers removed by both of the drums fall to tray 24, move downwardly therealong, and are discharged at the right end of the machine.

Thus, a poultry picking machine has been produced which is simple and economical, convenient to use, and which is adapted to perform both the roughing and finishing stages of picking. While a specific embodiment of the device has been disclosed, it is apparent that many minor changes of construction and operation could be made without departing from the spirit of the invention.

What I claim is:

1. In a poultry picking apparatus for effecting a complete picking of feathers and pin feathers of said poultry, the combination of a supporting frame, a pair of elongated rotary drums mounted on said frame, means connected to said drums for rotating the same in opposite directions relatively on substantially parallel axes, a first drum having a plurality of axially extending rows of relatively long fingers, said long fingers extending radially from the axis of rotation of said first drum during rotation thereof, and being pivotally mounted for free swinging movement adjacent to and on an axis substantially parallel with said axis of rotation of said first drum, a second drum having a number of axially extending spaced rows of relatively short and substantially inflexible fingers, said rows of short fingers being relatively close together to support poultry being picked thereon, said short fingers being normally radially disposed and having flexible connection for movement with respect to said second drum, said long fingers terminating adjacent but spaced from the short fingers during rotation of the drums, whereby the rotation of the first drum will produce a pressure against the poultry between the drums sufficient to cause picking of the feathers by said first drum and removal of pin feathers by the second drum.

2. In the invention as set forth in claim 1 wherein said axes of rotation of the drums are horizontal and the axis of rotation of said first drum is in a horizontal plane above the axis of rotation of the second drum.

GORDON W. JOHNSON.

References Cited in the file of this patent

UNITED STATES PATENTS

| Number | Name | Date |
|---|---|---|
| 382,736 | Schroeder | May 15, 1888 |
| 606,255 | Taylor et al. | June 28, 1898 |
| 614,408 | Palmer | Nov. 15, 1898 |
| 1,897,971 | Johnston | Feb. 14, 1933 |
| 2,429,628 | Johnson | Oct. 28, 1947 |
| 2,436,214 | Johnson | Feb. 17, 1948 |
| 2,439,334 | Bloom | Apr. 6, 1948 |
| 2,466,242 | Johnson | Apr. 5, 1949 |
| 2,472,468 | Digby | June 7, 1949 |
| 2,512,843 | Tomlinson | June 27, 1950 |
| 2,554,671 | Hodges | May 29, 1951 |
| 2,560,524 | Johnson | July 10, 1951 |